US012712733B1

(12) United States Patent
Antebi et al.

(10) Patent No.: US 12,712,733 B1
(45) Date of Patent: Aug. 18, 2026

(54) PARITY TOKEN FOR ERROR-LOCALIZED BLOCK DECODING

(71) Applicant: INTUIT INC., Mountain View, CA (US)

(72) Inventors: Sagiv Antebi, Tel Aviv (IL); Matan Vetzler, 'Givat Shmuel (IL); Ofir Ben Shoham, Giv'atayim (IL); Shai Ardazi, Petah Tikva (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/427,086

(22) Filed: Dec. 19, 2025

(51) Int. Cl.
*H04L 9/32* (2006.01)

(52) U.S. Cl.
CPC .................................. *H04L 9/3213* (2013.01)

(58) Field of Classification Search
None
See application file for complete search history.

(56) References Cited

U.S. PATENT DOCUMENTS 11,494,422 B1 * 11/2022 Arie ...................... G06F 40/174
12,585,873 B1 * 3/2026 Kim ...................... G06F 40/242
12,591,779 B1 * 3/2026 Ardazi ................... G06N 3/082
2021/0272114 A1 * 9/2021 Kita ................ G06Q 20/38215
2024/0419904 A1 * 12/2024 Wu ........................ G06N 3/045

* cited by examiner

*Primary Examiner* — Maikhanh Nguyen

(74) *Attorney, Agent, or Firm* — Patterson + Sheridan, LLP

(57) ABSTRACT

Aspects of the present disclosure involve blockwise token generation with selective error localization and repair. Aspects include generating, by a machine learning model, a structural plan comprising plan tokens that encode constraints expected to be satisfied by an output sequence. Aspects include parsing the plan tokens into a ledger of remaining constraints. Aspects include generating, by the machine learning model, the output sequence comprising a block of multiple candidate tokens. Aspects include computing local constraint signals for the block and comparing the local constraint signals to a corresponding subset of the ledger to produce a syndrome for token verification. Aspects include, based on the syndrome indicating a constraint violation, identifying one or more violating token positions via a token-to-constraint mapping. Aspects include generating, by the machine learning model, one or more replacement candidate tokens for the one or more violating token positions while retaining other candidate tokens in the block.

18 Claims, 5 Drawing Sheets

PARITY TOKEN FOR ERROR-LOCALIZED BLOCK DECODING

INTRODUCTION

Aspects of the present disclosure relate to error-localized block decoding, and more specifically, to a process involving generating a preliminary structural plan by a language processing machine learning model for use in dynamically verifying and selectively repairing blocks of tokens subsequently generated by the language processing machine learning model.

BACKGROUND

Recent advances in artificial intelligence (AI) have enabled the widespread adoption of language processing machine learning models for the performance of natural language processing (NLP) tasks, such as generating text (e.g., synthetic text), answering user queries in a conversational manner, translating text from one language to another, and/or the like. A language processing machine learning model or "language model" is a type of machine learning (ML) model trained on large volumes of text to learn the structure, meaning, and usage patterns of language. Language models make it possible for software to "understand" typical human speech or written content and respond to it by, in some cases, generating human-understandable responses through natural language generation (NLG).

Generating text with a language model is an autoregressive process that involves the language model predicting a next token given an input sequence of tokens (e.g., in some cases, including token(s) that were previously predicted by the language model). More specifically, given an input sequence of tokens, a language model may assign probabilities to each candidate output token in its vocabulary, where a probability assigned to a candidate output token represents a likelihood that the candidate output token is most likely to logically follow next in the sequence. The language model may select the next token by sampling according to these probabilities. For example, the language model may select, as the next token in the sequence, a candidate output token associated with a greatest probability (e.g., indicating that the token is the most likely and appropriate next token in the sequence).

In the context of language models, "tokens" may refer to units of text that the models process and generate. Tokens can represent individual characters, words, subwords, or even larger linguistic units, depending on the specific tokenization (e.g., segmentation of text into meaningful units to capture its semantic and syntactic structure) approach used. Tokens act as a bridge between text data and the numerical representations that language models are able to use. A "candidate output token" refers to a token that may be generated by a language model as a potential next token in a text sequence.

Language models are often deployed to generate structured text such as JavaScript Object Notation (JSON) objects, database queries, and source code. In many applications, correctness is defined not only by semantic fidelity but also by adherence to syntactic and formatting constraints, including balanced delimiters, quoted strings, and field separators. Even a single misplaced or missing symbol can render an entire output unusable by downstream parsers and execution engines.

To reduce latency, modern decoding strategies increasingly predict multiple future tokens in parallel. Parallel block decoding techniques often involve fine-tuning a model such as a transformer to generate a block of candidate tokens in a single forward pass, while in some cases leveraging key-value caching for previously accepted context. These techniques can substantially cut the number of model evaluations required to produce a sequence.

However, parallel generation introduces verification challenges. Because jointly sampled tokens may be interdependent, a small violation of structural rules by one token can invalidate a larger candidate span. Conventional verification mechanisms operate at a coarse granularity, accepting or rejecting entire blocks or contiguous prefixes. As a result, when a single token is malformed, a full block is often discarded, causing significant recomputation and increasing latency.

Existing correctness filters and grammar-based decoders can detect that a candidate span is invalid, but they generally do not attribute the failure to specific token positions within a block. In such cases, systems revert to wholesale rejection or full regeneration strategies. This behavior is particularly detrimental in formats where the location of errors is highly concentrated, such as closing braces at block boundaries or commas at field ends.

Structured-output requirements exacerbate the issue. Many production pipelines require precise terminators, balanced delimiters, and field ordering, and they enforce strict acceptance criteria to avoid downstream failures. When verification lacks fine-grained diagnostics, achieving these criteria often demands conservative decoding thresholds or repeated regeneration attempts, trading off speed for reliability.

Accordingly, there is a need in the art for improved generative machine learning systems.

BRIEF SUMMARY

According to an aspect of the present disclosure, a method for blockwise token generation with selective error localization and repair is provided. The method may include: generating, by a language processing machine learning model, prior to producing an output sequence, a structural plan comprising plan tokens that encode constraints expected to be satisfied by the output sequence; parsing the plan tokens into a ledger of remaining constraints; generating, by the language processing machine learning model in a single forward pass, the output sequence comprising a block of multiple candidate tokens; computing local constraint signals for the block and comparing the local constraint signals to a corresponding subset of the ledger to produce a syndrome for token verification; based on the syndrome indicating a constraint violation, identifying one or more violating token positions via a token-to-constraint mapping; and generating, by the language processing machine learning model in an additional single forward pass, one or more replacement candidate tokens for the one or more violating token positions while retaining other candidate tokens in the block.

According to other aspects, a non-transitory computer readable medium may store instructions that, when executed by one or more processors of a computing system, cause the computing system to perform one or more of the methods set forth above. According to other aspects, a system includes one or more processors and a memory storing instructions that, when executed by the one or more processors, cause the system to perform aspects of one or more of the methods set forth above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

The present disclosure relates to a method and system for blockwise token generation with selective error localization and repair.

In certain aspects, a language processing machine learning model is configured (e.g., via instructions in a prompt) to output a compact structural plan prior to content generation. The plan may then be parsed into a runtime ledger of constraints that are checked throughout blockwise decoding. The system computes verification signals based on the runtime ledger for each proposed block generated by the model, attributes violations to specific token positions, and selectively repairs only those positions, thereby avoiding wholesale block rejection.

Conventional parallel and speculative decoding techniques improve throughput by proposing multi-token spans, yet they typically accept or reject entire blocks or prefixes. Grammar filters and syntax validators can detect invalidity but rarely pinpoint which token within a jointly decoded span caused the problem. As a result, minor errors trigger full regeneration of otherwise correct tokens, increasing latency, wasting compute resources, and reducing reliability for structured outputs such as JavaScript Object Notation (JSON), structured query language (SQL), extensible markup language (XML), and code.

Techniques described herein introduce an explicit planning phase that encodes expected structural properties of the forthcoming sequence using parity bits and compact counters. This plan is maintained as a compact ledger that can be checked in real time as each new block is generated. During generation, local signals derived from proposed tokens are compared against the ledger to produce a "syndrome" that indicates satisfied versus violated constraints. Violations are mapped to token locations or neighborhoods, enabling selective regeneration of only the offending positions (e.g., through masking and re-sampling).

This selective repair mechanism yields fine-grained corrections without discarding valid tokens, preserving the benefits of set-based block decoding and speculative strategies. By separating plan generation, verification, localization, and repair, the system reduces the number of forward passes attributable to block rejections, stabilizes structured outputs at boundaries where errors concentrate, and improves efficiency while maintaining accuracy. The ledger and syndrome enable immediate detection and targeted remediation of problematic tokens within the block.

Compared to prior techniques that lack token-level localization or require complete block regeneration, the described systems provide a compact, model-generated constraint representation, real-time checks, and localized repair with fallback to grammar-constrained sampling when needed. These improvements reduce recomputation, lower rejection rates, and enhance robustness for structured generation, while remaining compatible with standard transformer architectures and key-value caching workflows.

Figure 1:
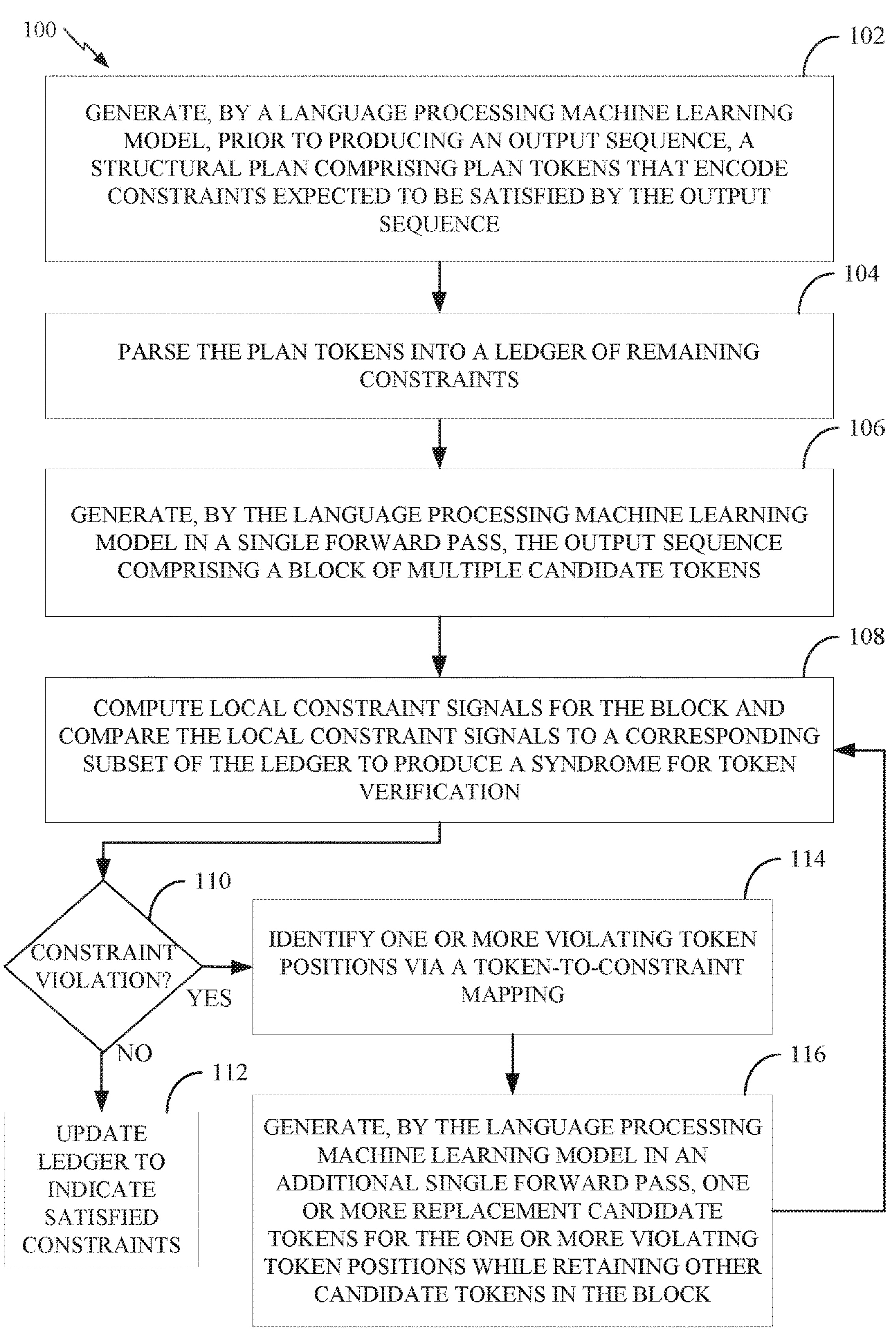
FIG. 1 illustrates a flow chart depicting example functionality related to blockwise token generation with selective error localization and repair, according to aspects of the present disclosure.

Example Flow Chart Related to Blockwise Token Generation With Selective Error Localization and Repair FIG. 1 illustrates a flow chart 100 depicting example functionality related to blockwise token generation with selective error localization and repair, according to aspects of the present disclosure.

The depicted functionality begins with operation 102, in which a machine learning model, prior to producing content tokens, generates a structural plan comprising plan tokens that encode structural constraints expected to be satisfied by the forthcoming sequence. The machine learning model may be, for example, a language processing machine learning model such as a large language model (LLM) or small language model. As described in more detail below with respect to FIG. 2, the structural plan may be generated according to a prompt that configures the model to perform such generation. The plan tokens may be generated as a compact preamble in the model's normal token vocabulary and may encode, for example, mod-2 parity indicators and bounded counters associated with balanced delimiters, quoted string parity, expected terminators, comma-at-end conditions, end-of-object or end-of-sequence flags, and/or other format-specific constraints. The plan may be intentionally small (e.g., limited in size), such as according to configuration information provided to the model (e.g., via the prompt), so as to impose less overhead in terms of resource consumption and to enable constant-time checks in a resource efficient and low-latency manner during subsequent decoding.

At operation 104, the plan tokens are parsed into a ledger of remaining constraints. The ledger may be a bounded-size runtime data structure comprising bit fields and small integer counters that represent what constraints remain to be satisfied as generation proceeds. Parsing may include deserializing plan tokens into a fixed layout of fields, validating ranges or parity values, initializing counters, and/or the like according to the structural plan. The ledger is maintained alongside the decoding state and is updated as constraints are satisfied. Because the ledger comprises a a limited number of fields, read and update operations may be performed in O(1) time per block.

Operation 106 initiates blockwise generation by producing, in a single forward pass of the language processing machine learning model, a block of multiple candidate tokens. In certain aspects, the block is generated using set block decoding, where masked positions in the future block are jointly predicted using bidirectional attention within the block while maintaining autoregressive attention over the accepted past. An entropy-bounded sampler may select which positions to reveal together, controlling a speed-accuracy tradeoff via a tunable parameter that adjusts how many tokens are proposed in parallel.

Operation 108 computes local constraint signals for the proposed block and compares those signals to a corresponding subset of the ledger to produce a syndrome for token verification. Local signals may include recomputed parity over delimiters and quotes observed in the block, counter deltas reflecting opening or closing tokens, presence of expected terminators at block boundaries, and indicators for comma-at-end or field separators. The comparison produces a syndrome that encodes, for each checked constraint, whether the block satisfies the constraint or exhibits a violation. The syndrome may be represented as a bitmask, a set of deltas, or other compact indicators suitable for immediate processing.

Decision operation 110 evaluates whether the syndrome indicates a constraint violation. If no violation is present, operation 112 updates the ledger to indicate satisfied constraints, for example by decrementing counters, flipping parity bits, or clearing flags associated with constraints fulfilled by the accepted tokens in the block. Control then advances to the next block, and the process repeats until a terminal condition is met such as an end-of-sequence token or the ledger reaching a satisfied state.

If operation 110 indicates a violation, control proceeds to operation 114, which identifies one or more violating token positions via a token-to-constraint mapping. The mapping associates specific constraint fields with token locations or neighborhoods within the block where violations are most likely concentrated. By way of example, a brace parity mismatch may map to a last bracket neighborhood in the block, a comma-end indicator may map to a final position in a field region, and a missing terminator may map to a block boundary. The mapping may be configured, learned, or hybrid, and may incorporate contextual features from adjacent tokens to refine localization.

After operation 114, operation 116 performs selective repair by generating, in an additional single forward pass of the language processing machine learning model, one or more replacement candidate tokens for the identified violating positions while retaining other candidate tokens in the block. In certain embodiments, the violating positions are re-masked and re-sampled using the same model according to a set block decoding technique, with the remainder of the block treated as fixed context to preserve correct tokens. If a mismatch persists after a capped number of repair attempts, a minimal local fallback may be invoked, such as grammar-constrained resampling limited to those positions or a constrained decoder that enforces mandatory symbols at boundaries.

The repaired tokens are substituted into the block, and the block is re-verified against the ledger as needed, such as performing operation 108 again on the repaired block and again performing decision operation 110 to determine if any constraints are violated by the repaired block. If any constraints are still violated, additional selective repair may be performed (e.g., by operations 114 and 116), and the further repaired block may be re-verified against the ledger.

Following selective repair, if no constraint violations are detected at decision operation 110, operation 112 updates the ledger to reflect constraints satisfied by the repaired block. Ledger updates may include decrementing counters when closing delimiters are emitted, flipping parity bits when pairs are balanced, clearing end-of-object flags when terminators appear, and recording metadata such as syndrome masks and repair positions to support auditing or downstream error analysis. Once the ledger is updated, the block is accepted and the flow may return to operation 106 for generation of the next block.

The loop of proposing, verifying, localizing violation(s), repairing, and updating continues until the ledger reaches a terminal satisfied configuration or until an end-of-sequence token is produced, at which point generation completes. If the ledger is inconsistent at completion, a minimal local fix cycle may be executed to reconcile outstanding constraints or a structured error signal may be emitted. The illustrated process leverages the compact plan-derived ledger for constant-time verification, attributes violations to specific token positions within jointly decoded blocks, and performs fine-grained repairs without discarding valid tokens, thereby reducing recomputation and improving robustness of structured outputs such as JSON, SQL, XML, and source code while remaining compatible with set block decoding, speculative strategies, and key-value cache reuse.

Figure 2:
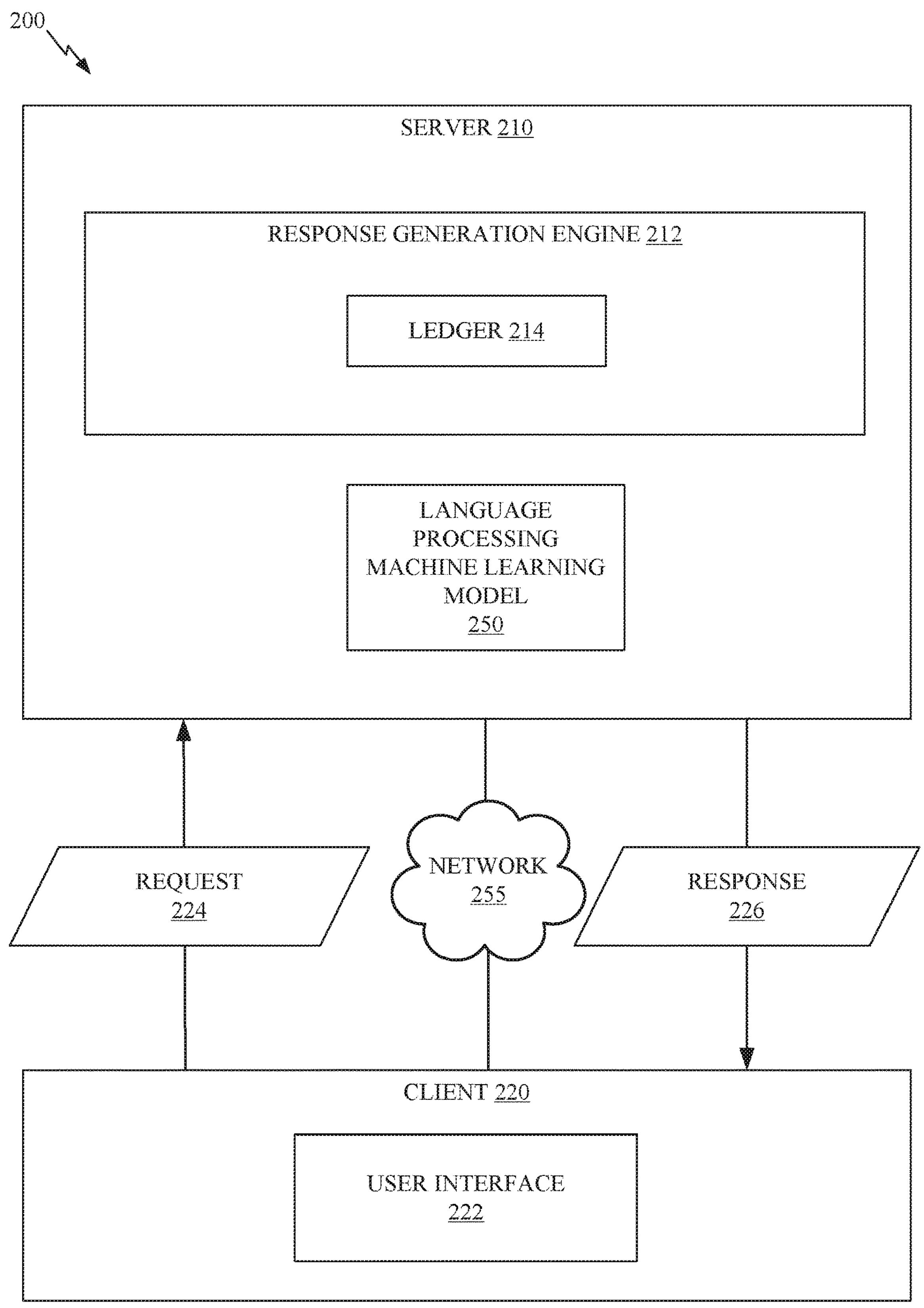
FIG. 2 illustrates a block diagram of a computing environment for blockwise token generation with selective error localization and repair, according to aspects of the present disclosure.

Example Computing Components Related to Blockwise Token Generation With Selective Error Localization and Repair FIG. 2 illustrates a block diagram of a computing environment 200 related to blockwise token generation with selective error localization and repair. The computing environment 200 may include a server 210 and a client 220 connected via a network 255.

Server 210 may comprise one or more processors and a memory storing instructions. In some cases, server 210 may be an application server or other computing device that hosts a computing application accessed by one or more users, such as via user interface 222 on client 220.

The client 220 be a computing device by which a user interacts with a computing application, and may include a user interface 222 that enables such interaction. The client 220 may send a request 224 through the network 255 to the server 210, and may receive a response 226 back through the network 255 in response. For example, request 224 may be a request for information, to perform an operation, and/or the like, such as based on input provided by a user interacting with user interface 222 (e.g., selecting a user interface element, providing natural language input, and/or the like).

Server 210 may generate response 226 (e.g., in response to request 224) through a process that involves blockwise token generation with selective error localization and repair by response generation engine 212, using language processing machine learning model 250 and ledger 214 as appropriate. As described in more detail below with respect to FIG. 3, language processing machine learning model 250 may be a generative machine learning model such as an LLM or small language model that is configured to perform blockwise token generation (e.g., according to a set block decoding technique), such as through a particular training process, and may be trained in such a manner as to enable the model to interpret and apply natural language instructions provided via a prompt, such as to generate a structural plan as described herein prior to block generation.

In various aspects, response generation engine 212 orchestrates receipt, processing, and fulfillment of a generation request by coordinating operations of language processing machine learning model 250 and creation, utilization, and updating of ledger 214. Request 224 may include a prompt (e.g., to perform a generative task, such as to generate a natural language response or to generate structured content such as in the form of JSON, SQL, XML, source code, or the like) and, in some aspects, may include or be associated with optional configuration parameters such as decoding settings, latency budgets, and/or the like. Upon receipt of request 224, response generation engine 212 may coordinate operations to perform the requested generative task.

Response generation engine 212 may invoke language processing machine learning model 250 to generate a compact global structural plan including plan tokens, and may parse the plan into ledger 214, a bounded data structure of remaining constraints, as described in more detail below with respect to FIG. 3. Response generation engine 212 then generates a block of candidate tokens in a single forward pass, computes local constraint signals from the proposed block, and compares those signals to corresponding entries in ledger 214 to produce a syndrome.

If the syndrome indicates no violations, response generation engine 212 updates ledger 214 to reflect satisfied constraints and appends the accepted tokens to the partial output. If the syndrome indicates a violation, response generation engine 212 localizes one or more offending positions using a token-to-constraint mapping and selectively repairs those positions (e.g., by re-masking and re-sampling those positions in an additional single forward pass of language processing machine learning model 250) while retaining non-offending tokens. Response generation engine 212 iterates block proposal, verification, localization, selective repair, and ledger update until the ledger reaches a terminal satisfied state or an end-of-sequence token is produced, at which point the finalized sequence may be serialized and transmitted as response 226 to client 220 via network 255. Operation of response generation engine 212 is described in more detail below with respect to FIG. 3.

Response 226 may be transmitted to client 220 and, in some aspects, logged to a persistent store for auditing, analytics, and/or future training. In some aspects, response 226 may be transmitted to another computing component for further processing in addition to or instead of being transmitted to client 220. For example, if response 226 includes an executable object or code that can be compiled into an executable object, the executable object may be executed on one or more computing devices or the code may be compiled and executed on one or more computing devices.

Accordingly, the architecture depicted in FIG. 2 enables constant-time constraint verification, token-level localization, and selective repair within blocks, reducing recomputation and latency while improving robustness of structured responses such as response 226.

Figure 3:
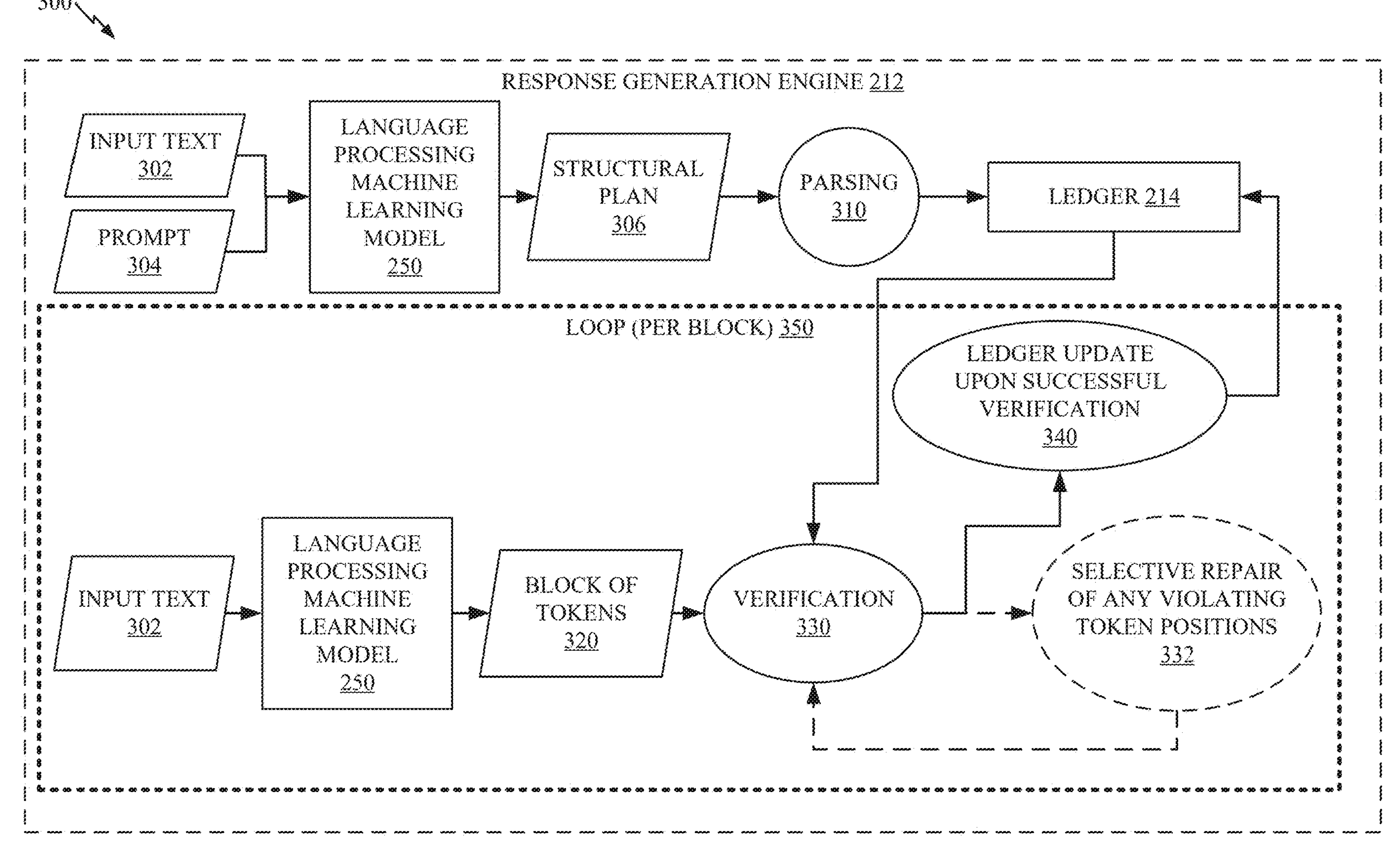
FIG. 3 is a block diagram illustrating a workflow related to blockwise token generation with selective error localization and repair, according to aspects of the present disclosure.

Example Workflow for Blockwise Token Generation With Selective Error-Localization and Repair FIG. 3 is a block diagram 300 illustrating a workflow related to blockwise token generation with selective error localization and repair, according to aspects of the present disclosure. Block diagram 300 includes response generation engine 212, language processing machine learning model 250, and ledger 214 of FIG. 2.

In block diagram 300, response generation engine 212 produces a structured output sequence by emitting a global structural plan, maintaining a compact ledger of remaining constraints, and performing blockwise verification with selective token repair. The process begins with input text 302, which may be a user prompt (e.g., from request 224 of FIG. 2) or a partially formed context, which is provided along with a prompt 304 to language processing machine learning model 250, which emits a structural plan 306 prior to content generation. In some aspects, input text 302 may be included within prompt 304 (e.g., by populating a field within prompt 304 using input text 302) instead of being provided separately to language processing machine learning model 250.

Prompt 304 may be a control input provided to language processing machine learning model 250, such as in the form of natural language instructions, that conditions language processing machine learning model 250 for plan generation and, in some aspects, also for content generation following plan generation (or content generation may be instructed in a different prompt). In certain aspects, prompt 304 includes generative task instructions (e.g., "produce a JSON object for user profile"), such as from input text 302, contextual text or prior conversation turns, and/or instructions that delineate generation of a plan prior to content generation. The instructions may comprise a start-of-plan marker, optional plan field hints or format tags (such as JSON, SQL, code, or XML), an end-of-plan marker that signals transition to content, and/or the like. When the decoding session begins, prompt 304 may configure the model to first generate the structural plan 306 as plan tokens, which response generation engine 212 parses into ledger 214, and then to generate blocks of content tokens in loop 350. Prompt 304 may also carry configuration metadata, such as desired block size, sampling policy (e.g., entropy-bounded sampling), retry budgets, strictness level for grammar-constrained fallback, and/or the like, that response generation engine 212 may use to adjust decoding behavior while remaining transparent to the end user.

The structural plan 306 may comprise plan tokens that encode anticipated structural constraints for the forthcoming sequence, including parity indicators and bounded counters for delimiters, quote balance, expected terminators, comma-at-end requirements, end-of-object or end-of-sequence flags, and/or the like.

In some aspects, structural plan 306 represents a compact parity vector that encodes, in a short preamble of normal vocabulary tokens, structural constraints the forthcoming sequence is expected to satisfy. The parity vector may comprise mod-2 parity indicators and small bounded counters that summarize format properties such as delimiter balance, quote parity, expected terminators, comma-at-end requirements, and end-of-object or end-of-sequence flags. In one embodiment, the model outputs the parity vector within explicit start-of-plan and end-of-plan markers (e.g., <PV> and </PV> or the like, where PV stands for parity vector), where each token packs one or more bitfields and small integers representing, for example, brace_count, quote_parity, need_comma_end, or eoo_flag, such as according to instructions in prompt 304.

At parsing 310, response generation engine 212 converts the plan tokens into ledger 214, which may be a runtime ledger comprising bit fields and small integer counters representing constraints that remain to be satisfied as generation proceeds. The ledger 214 may be bounded in size so that read, compare, and update operations are performed in constant time per block.

Following ledger initialization for the generative task, response generation engine 212 enters a loop 350 that operates per block of tokens. On each iteration of loop 350, language processing machine learning model 250 proposes a block of tokens 320 (e.g., based on input text 302 and/or a partially formed context, such as based on accepted blocks of tokens so far in the generative task) in a single forward pass. In certain aspects, language processing machine learning model 150 utilizes set block decoding where masked positions inside the future block are jointly predicted using bidirectional attention within the block while maintaining autoregressive attention over accepted past tokens. An entropy-based or entropy-bounded sampler may be employed to select which positions to reveal jointly, balancing a speed-accuracy tradeoff by adjusting how many tokens are proposed in parallel and which tokens are exposed based on predictive confidence.

At verification 330, response generation engine 212 computes local constraint signals from the proposed block 320 and compares those signals to a corresponding subset of ledger 214 to produce a syndrome that indicates whether constraints are satisfied or violated. Local signals may include updated parities over observed delimiters and quotes, counter deltas caused by opening or closing symbols, presence or absence of required terminators at block boundaries, indicators for comma-at-end, and/or other (e.g., format-related) requirements. The syndrome may be represented as a bitmask or compact set of deltas aligned to ledger fields, enabling efficient determination of constraint compliance. If the syndrome indicates satisfaction of applicable constraints, a ledger update upon successful verification 340 is performed to decrement counters, flip parity bits, clear flags, and/or otherwise record that the constraints represented by the accepted tokens have been met. The accepted tokens are then committed to the output, and the loop 350 advances to the next block until the ledger 214 reaches a terminal satisfied state or an end-of-sequence condition occurs.

When the syndrome indicates a violation at verification 330, response generation engine 212 performs selective repair of any violating token positions 332 rather than discarding the entire block. A token-to-constraint mapping associates specific constraints with token positions or neighborhoods within the block where the error is most likely concentrated, for example mapping brace parity mismatches to the last bracket neighborhood, mapping comma-end indicators to the final position in a field region, or mapping terminator constraints to block boundaries. The identified violating positions may be re-masked, and the language processing machine learning model 250 may be invoked in an additional single forward pass to generate replacement candidate tokens only for those masked positions while retaining non-violating tokens in the block. If mismatches persist after a capped number of repairs at the same positions, the engine may apply a minimal local fallback, such as grammar-constrained resampling restricted to the offending slots, before repeating verification 330 and, upon satisfaction, performing the ledger update 340. In all cases, ledger 214 maintains a compact record of remaining constraints, allowing constant-time checks at each iteration of loop 350.

Language processing machine learning model 250 may have been trained to support both efficient parallel block generation and accurate plan generation. Language processing machine learning models are typically trained in two stages. First, pretraining may be performed on a vast corpus of unlabeled text using a self-supervised objective such as next-token prediction, where the model learns statistical regularities of language by predicting each token given its preceding context. This stage may use large-scale datasets, tokenization, transformer architectures with multihead self-attention, and optimization with stochastic gradient descent variants (e.g., Adam) over many epochs or steps with techniques like learning-rate schedules, mixed-precision training, and distributed data/model/sequence parallelism. Second, the pretrained model may be adapted to target tasks via fine-tuning, which can include supervised fine-tuning on curated instruction-response pairs, preference-based optimization (e.g., reinforcement learning from human or AI feedback) to align outputs with desired behaviors, and domain adaptation on specialized corpora. During this phase, hyperparameters, sampling strategies, and safety constraints may be refined, and evaluation may be conducted with held-out benchmarks and/or red-teaming to assess quality, robustness, and safety. Throughout, regularization (dropout, weight decay), stabilization (gradient clipping, norm/weight scaling), and infrastructure practices (checkpointing, sharding, fault tolerance) may be employed to manage training efficiency and reliability.

In some aspects, language processing machine learning model 250 is a transformer-based autoregressive network or another suitable type of generative machine learning model, and may have been trained and/or fine-tuned under a set block decoding regimen. For example, during training, future tokens inside a block may be randomly masked and predicted using bidirectional attention confined to the block while preserving causal attention over the accepted context. A joint loss may be optimized that combines next-token prediction with masked-token prediction for the block, thereby enabling single-pass generation of multiple tokens at inference while maintaining compatibility with key-value cache reuse.

To facilitate plan generation, the tokenizer and output head of language processing machine learning model 250 may include reserved symbols for plan delimiters and plan fields, and/or the training data may be augmented with compact structural labels derived from ground-truth sequences across domains such as JSON, SQL, XML, and/or source code. These labels may encode mod-2 parity indicators and bounded counters tied to delimiters, quotes, field separators, terminators, and/or the like. A multi-task objective may supervise the model to emit a bounded plan segment at the start of decoding and to maintain consistency between the emitted plan and subsequent content. In deployment, the same language processing machine learning model 250 emits the structural plan 306 (which is "global" in the sense that it is for the entirety of a particular generative task and applies across multiple block generations), proposes blocks 320, and produces replacement tokens during selective repair 332, while the response generation engine 212 may perform parsing 310, maintenance of ledger 214, verification 330 via syndrome computation, and/or ledger updates 340 to complete generation with fine-grained corrections and reduced recomputation.

In an example, a user submits a request (e.g., via client 220 of FIG. 2) to produce a structured JSON response, and response generation engine 212 initializes the response generation process. The language processing machine learning model 250 is first conditioned by prompt 304 to emit a global structural plan 306 as plan tokens, for example a compact parity vector indicating brace_count=1, need_comma_end=2, and quote_parity=0 within explicit start-of-plan and end-of-plan markers. Response generation engine 212 parses global structural plan 306 into ledger 214, a bounded record of remaining constraints. The language processing machine learning model 250 then proposes, in a single forward pass, a block of tokens such as the following example block indicated between brackets: [“name”: “Alice”, “age”: 25.], such as using set block decoding with an entropy-bounded sampler to jointly reveal masked positions.

Verification logic recomputes local constraint signals over the block, such as including brace parity, quote parity, comma-at-end, and terminator presence, compares those local constraint signals to ledger 214, and produces a syndrome that flags a boundary violation (e.g., in this case a period instead of a closing brace). Using a token-to-constraint mapping, response generation engine 212 localizes the violation to the last position in the block, selectively re-masks only that position, and invokes language processing machine learning model 250 in an additional single forward pass to re-sample a replacement token, yielding a closing brace. The repaired block, including the closing brace instead of the period, is re-verified and, upon satisfaction, response generation engine 212 updates ledger entries (e.g., decrement brace_count to zero, clear need_comma_end) and commits the block to the output. The process iterates, including propose, verify, localize, repair, and update, until the ledger reaches a terminal satisfied state or an end-of-sequence token is emitted. The finalized, structurally valid JSON is serialized and returned as response 226 of FIG. 2, with optional logging of plan tokens, ledger snapshots, syndrome masks, repair positions, and/or the like for auditing and future model improvement.

Example Machine Learning Model

Figure 4:
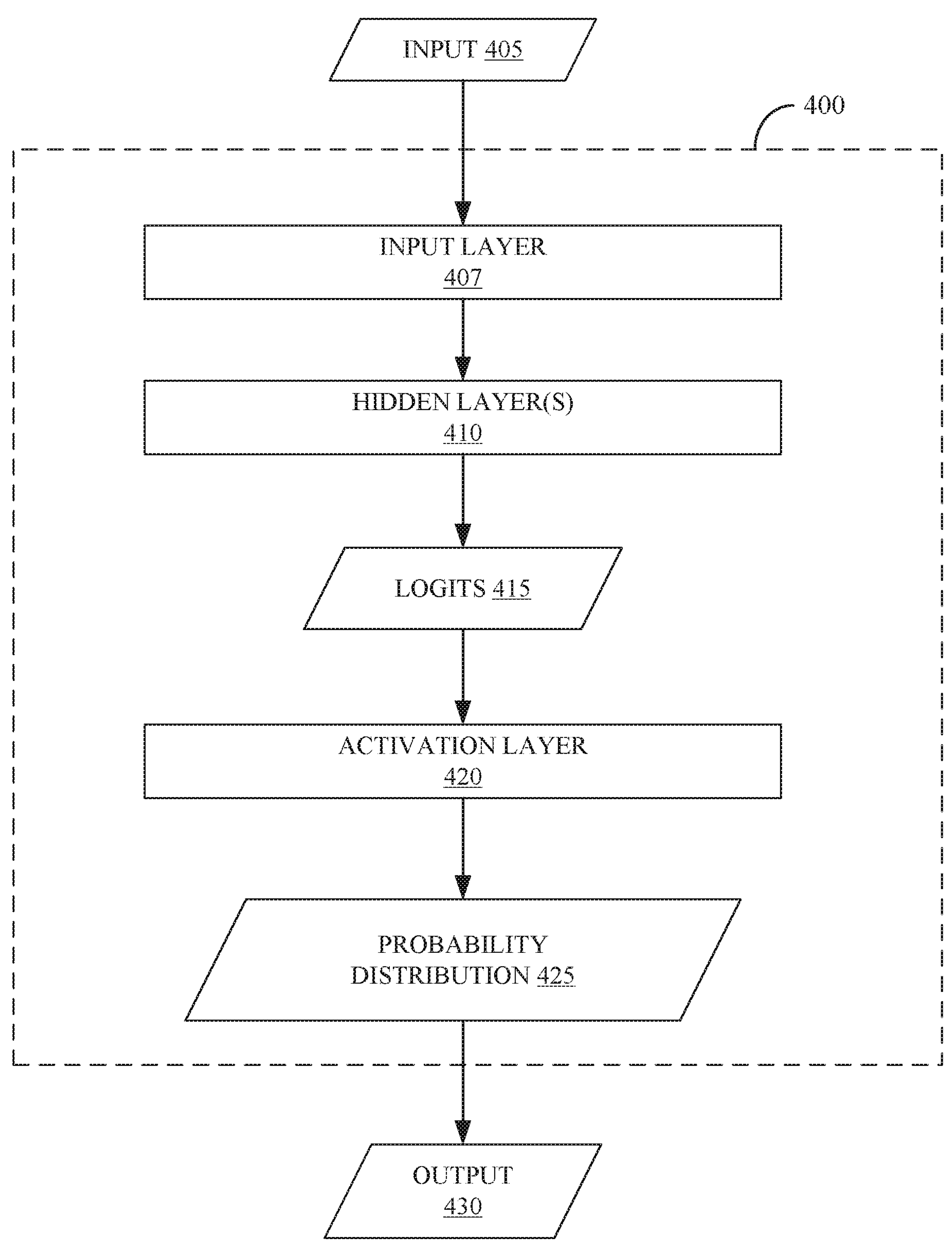
FIG. 4 depicts an example machine learning model according to aspects of the present disclosure.

FIG. 4 depicts an example machine learning model 400 according to embodiments disclosed herein. The machine learning model 400 may correspond to language processing machine learning model 250 of FIGS. 2-3, and/or another machine learning model as described herein.

The machine learning model 400 represents a transformer model architecture having a plurality of layers. The first set of these layers may be hidden layers 410. The hidden layers 410 may include decoder layers. The hidden layers 410 of the machine learning model 400 may include one or more encoder layers, such as encoder layers found in a Bidirectional Encoder Representations from Transformer (BERT) model or a similar model used to generate embeddings. In some embodiments, a hidden state output generated by an encoder layer is used to generate a subsequent hidden state output via a decoder layer.

The hidden layers 410 may process an output generated by an input layer 407. The product of the processing performed by the hidden layers 410 (also referred to as hidden states of the machine learning model 400) may include output logits 415 that indicate raw, non-normalized scores or probabilities. The probabilities may correspond to probabilities of candidate tokens being the next token in a response (e.g., if the model 400 is a generative model). For example, if the next token in a response is likely to be a particular word, the logit probabilities corresponding to the particular word may be relatively high compared to the logit probabilities corresponding to other words.

The logits 415 may be provided to an activation layer 420. The activation layer 420 may use an activation function, such as a softmax function, to generate a probability distribution 425 based on the logits 415. The generated probability distribution 345 may be a probability distribution for different tokens. different scores, and/or the like. The probability distribution 425 may then be converted into tokens (e.g., a block of tokens), a score, and/or the like and included in an output 430.

Architecture of the Example Machine Learning Model

The machine learning model 400 may be implemented using hardware and/or software. Each of the layers of the machine learning model 400 (e.g., input layer 407 and hidden layers 410) may comprise one or more neurons arranged in one or more neuron arrays. In an example embodiment, a neuron may comprise a register, a microprocessor, and at least one input. Each neuron produces an output, or activation, based on an activation function that uses the outputs of the previous layer and a set of weights as inputs. Each neuron in a neuron array may be connected to another neuron via a synaptic circuit. A synaptic circuit may include a memory for storing a synaptic weight. In some embodiments, the parameters of a model may include the synaptic weights of the model. Thus, a training process (e.g., a supervised learning process) for the model may involve adjusting the synaptic weights of the model until a condition is met. An example machine learning model may be a neural network having an input layer, an output layer, and a plurality of fully connected hidden layers (e.g., hidden layers 410). In some embodiments, a machine learning model may be implemented by an application-specific integrated circuit (ASIC). ASICs may be specially customized for a specific artificial intelligence application and provide superior computing capabilities and reduced electricity consumption compared to traditional CPUs.

In the context of set block decoding, the pipeline of machine learning model 400 may be executed to propose multiple future tokens in a single forward pass, such as yielding a joint probability distribution 425 over a block in a manner that leverages autoregressive attention for past context and bidirectional attention within the block. As described herein, the response generation engine may compute local constraint signals from the proposed block, compare those constraint signals against a compact ledger derived from a previously emitted global plan to obtain a syndrome, localize violations to specific token positions, and invoke another forward pass through machine learning model 400 to selectively re-sample only those positions (e.g., using token masking) while retaining previously valid tokens in the block, thereby achieving fine-grained repair without discarding entire blocks.

Example Processing Systems

Figure 5A:
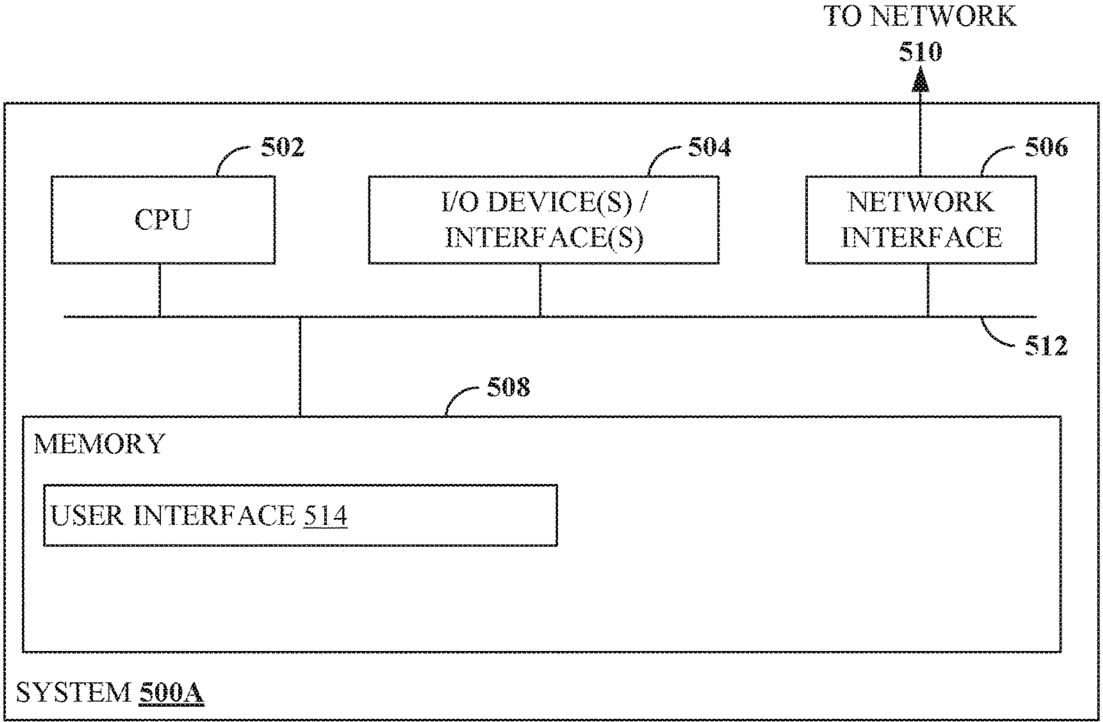
FIG. 5A and FIG. 5B illustrate block diagrams of two computing systems related to blockwise token generation with selective error localization and repair, according to aspects of the present disclosure.

FIG. 5A illustrates an example system 500A with which embodiments of the present disclosure may be implemented. For example, system 500A may be configured to perform aspects of operations 100 of FIG. 1 and/or other operations described herein. In one example system 500A corresponds to client 220 of FIG. 2.

System 500A includes a central processing unit (CPU) 502, one or more I/O device interfaces 504 that may allow for the connection of various I/O devices (e.g., keyboards, displays, mouse devices, pen input, etc.) to the system 500A, network interface 506, a memory 508, and an interconnect 512. It is contemplated that one or more components of system 500A may be located remotely and accessed via a network 510. It is further contemplated that one or more components of system 500A may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes a user interface 514, which may be representative of user interface 222 of FIG. 2. For example, a user may interact with user interface 514 to provide input text, submit input text, receive responses, provide feedback with respect to responses, perform other actions based on or in connection with input text and/or responses, and/or the like. For example, user feedback with respect to responses (e.g., that were generated using techniques described herein for blockwise token generation with selective error localization and repair) may be used to retrain one or more machine learning models through a supervised learning process for improved performance, such as machine learning model 556 of FIG. 5B.

Figure 5B:
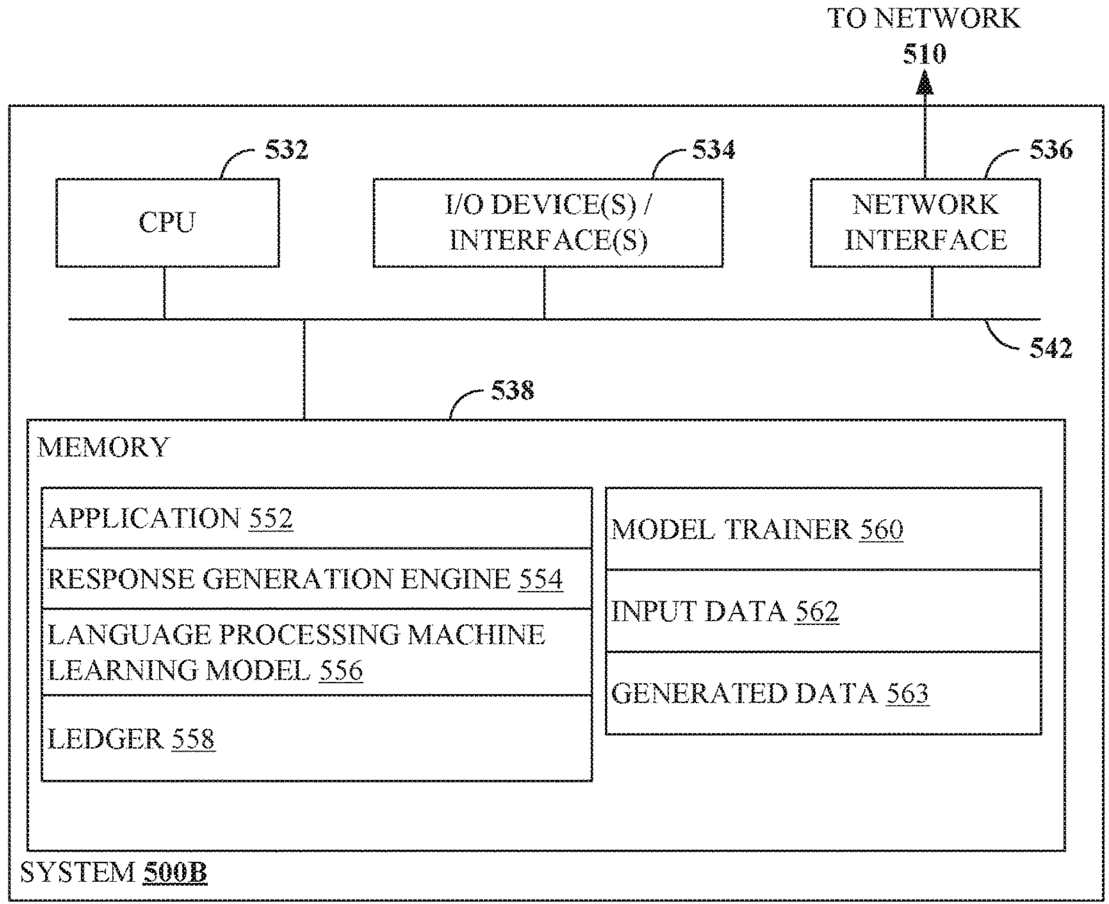

FIG. 5B illustrates another example system 500B with which embodiments of the present disclosure may be implemented. For example, system 500B may correspond to server 210 of FIG. 2, and may be configured to perform aspects of operations 100 of FIG. 1 and/or one or more other operations described herein.

System 500B includes a CPU 532, one or more I/O device interfaces 534 that may allow for the connection of various I/O devices (e.g., keyboards, displays, mouse devices, pen input, etc.) to the system 500B, network interface 536, a memory 538, and an interconnect 542. It is contemplated that one or more components of system 500B may be located remotely and accessed via a network 510. It is further contemplated that one or more components of system 500B may comprise physical components or virtualized components.

CPU 532 may retrieve and execute programming instructions stored in the memory 538. Similarly, the CPU 532 may retrieve and store application data residing in the memory 538. The interconnect 542 transmits programming instructions and application data, among the CPU 532, I/O device interface 534, network interface 536, and memory 538. CPU 532 is included to be representative of a single CPU, multiple CPUs, a single CPU having multiple processing cores, and other arrangements.

Additionally, the memory 538 is included to be representative of a random access memory or the like. In some embodiments, memory 538 may comprise a disk drive, solid state drive, or a collection of storage devices distributed across multiple storage systems. Although shown as a single unit, the memory 538 may be a combination of fixed and/or removable storage devices, such as fixed disc drives, removable memory cards or optical storage, network attached storage (NAS), or a storage area-network (SAN).

As shown, memory 538 includes an application 552, which may be representative of a computing application that performs language processing functionality, such as an application that includes an AI-assisted conversational system, a chat bot, a content generation engine, or the like. In some aspects, user interface 514 of FIG. 5A provides user interface screens corresponding to application 552.

As shown, memory 538 further includes response generation engine 554, language processing machine learning model 556, and ledger 558, which may be representative of response generation engine 212, language processing machine learning model 250, and ledger 214 of FIG. 2. In some aspects, response generation engine 554 may be part of application 552, or may be separate from application 552. Memory 538 may further include model trainer 560, which may perform aspects related to training and/or fine-tuning language processing machine learning model 556, such as one or more training processes described above. In other aspects, model trainer 560 may be located and executed on a separate system from the system on which such machine learning model(s) are run for use in response generation.

Memory 538 may further include input data 562, which may include request 224 of FIG. 2, input text 302 of FIG. 3, prompt 304 of FIG. 3, input 405 of FIG. 4, and/or the like. Memory 538 may further include generated data 563, which may include response 226 of FIG. 2, structural plan 306 and/or block of tokens 320 of FIG. 3, output 430 of FIG. 4, and/or the like.

It is noted that systems 500A and 500B are included as examples, and certain functionality described with respect to systems 500A and/or 500B and/or otherwise described herein may be implemented via more or fewer devices and/or components.

Example Clauses

Clause 1: A system for blockwise token generation with selective error localization and repair, comprising: one or more processors; and a non-transitory computer readable medium storing instructions that, when executed by the one or more processors, cause the system to: generate, by a language processing machine learning model, prior to producing an output sequence, a structural plan comprising plan tokens that encode constraints expected to be satisfied by the output sequence; parse the plan tokens into a ledger of remaining constraints; generate, by the language processing machine learning model in a single forward pass, the output sequence comprising a block of multiple candidate tokens; compute local constraint signals for the block and compare the local constraint signals to a corresponding subset of the ledger to produce a syndrome for token verification; based on the syndrome indicating a constraint violation, identify one or more violating token positions via a token-to-constraint mapping; and generate, by the language processing machine learning model in an additional single forward pass, one or more replacement candidate tokens for the one or more violating token positions while retaining other candidate tokens in the block.

Clause 2: The system of Clause 1, wherein the instructions, when executed by the one or more processors, further cause the system to: update the ledger to reflect one or more satisfied constraints; and repeat block generation using the language processing machine learning model and syndrome-based token verification until the ledger indicates a terminal satisfied state or a termination token is produced.

Clause 3: The system of Clause 2, wherein the updating of the ledger comprises decrementing, flipping, or clearing one or more ledger entries corresponding to the one or more satisfied constraints and storing metadata in association with the one or more ledger entries to support post-generation auditing and error analysis.

Clause 4: The system of any one of Clause 1-3, wherein the generating of the structural plan comprises generating parity indicators and bounded counters associated with delimiters, quote balance, terminators, and end-of-object flags.

Clause 5: The system of Clause 4, wherein the generating of the structural plan further comprises generating delimiters, quote balance, terminators, and end-of-object flags associated with the parity indicators and the bounded counters.

Clause 6: The system of any one of Clause 1-5, wherein the parsing of the plan tokens produces a bounded-size ledger comprising bit fields and integer counters that are updated per block as constraints are satisfied.

Clause 7: The system of any one of Clause 1-6, wherein the generating of the block of the multiple candidate tokens comprises performing set block decoding with an entropy-bounded sampler to select a subset of tokens to reveal jointly based on predicted dependence.

Clause 8: The system of any one of Clause 1-7, wherein the computing of the local constraint signals comprises: computing, over the block and adjacent context, parity values and counter deltas; and comparing the computed parity values and the computed counter deltas to corresponding entries in the ledger to produce the syndrome.

Clause 9: The system of any one of Clause 1-8, wherein the identifying of the one or more violating token positions comprises applying a predefined token-to-constraint mapping that associates particular constraint fields with token locations or neighborhoods.

Clause 10: The system of any one of Clause 1-9, wherein the generating of the one or more replacement candidate tokens comprises: masking only the one or more violating token positions and re-sampling the masked one or more violating token positions while retaining other candidate tokens in the block; and invoking a grammar-constrained resampling fallback for one or more corresponding violating positions when a violation persists after a capped number of retries.

Clause 11: A method for blockwise token generation with selective error localization and repair, comprising: generating, by a language processing machine learning model, prior to producing an output sequence, a structural plan comprising plan tokens that encode constraints expected to be satisfied by the output sequence; parsing the plan tokens into a ledger of remaining constraints; generating, by the language processing machine learning model in a single forward pass, the output sequence comprising a block of multiple candidate tokens; computing local constraint signals for the block and comparing the local constraint signals to a corresponding subset of the ledger to produce a syndrome for token verification; based on the syndrome indicating a constraint violation, identifying one or more violating token positions via a token-to-constraint mapping; and generating, by the language processing machine learning model in an additional single forward pass, one or more replacement candidate tokens for the one or more violating token positions while retaining other candidate tokens in the block.

Clause 12: The method of Clause 11, further comprising: updating the ledger to reflect one or more satisfied constraints; and repeating block generation using the language processing machine learning model and syndrome-based token verification until the ledger indicates a terminal satisfied state or a termination token is produced.

Clause 13: The method of Clause 12, wherein the updating of the ledger comprises decrementing, flipping, or clearing one or more ledger entries corresponding to the one or more satisfied constraints and storing metadata in association with the one or more ledger entries to support post-generation auditing and error analysis.

Clause 14: The method of any one of Clause 11-13, wherein the generating of the structural plan comprises generating parity indicators and bounded counters associated with delimiters, quote balance, terminators, and end-of-object flags.

Clause 15: The method of Clause 14, wherein the generating of the structural plan further comprises generating delimiters, quote balance, terminators, and end-of-object flags associated with the parity indicators and the bounded counters.

Clause 16: The method of any one of Clause 11-15, wherein the parsing of the plan tokens produces a bounded-size ledger comprising bit fields and integer counters that are updated per block as constraints are satisfied.

Clause 17: The method of any one of Clause 11-16, wherein the generating of the block of the multiple candidate tokens comprises performing set block decoding with an entropy-bounded sampler to select a subset of tokens to reveal jointly based on predicted dependence.

Clause 18: The method of any one of Clause 11-17, wherein the computing of the local constraint signals comprises: computing, over the block and adjacent context, parity values and counter deltas; and comparing the computed parity values and the computed counter deltas to corresponding entries in the ledger to produce the syndrome.

Clause 19: The method of any one of Clause 11-18, wherein the identifying of the one or more violating token positions comprises applying a predefined token-to-constraint mapping that associates particular constraint fields with token locations or neighborhoods.

Clause 20: A non-transitory computer readable medium storing instructions that, when executed by one or more processors if a computing system, cause the computing system to: generate, by a language processing machine learning model, prior to producing an output sequence, a structural plan comprising plan tokens that encode constraints expected to be satisfied by the output sequence; parse the plan tokens into a ledger of remaining constraints; generate, by the language processing machine learning model in a single forward pass, the output sequence comprising a block of multiple candidate tokens; compute local constraint signals for the block and compare the local constraint signals to a corresponding subset of the ledger to produce a syndrome for token verification; based on the syndrome indicating a constraint violation, identify one or more violating token positions via a token-to-constraint mapping; and generate, by the language processing machine learning model in an additional single forward pass, one or more replacement candidate tokens for the one or more violating token positions while retaining other candidate tokens in the block.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system for blockwise token generation with selective error localization and repair, comprising:

one or more processors; and a non-transitory computer readable medium storing instructions that, when executed by the one or more processors, cause the system to:

generate, by a language processing machine learning model, prior to producing an output sequence, a structural plan comprising plan tokens that encode constraints expected to be satisfied by the output sequence;

parse the plan tokens into a ledger of remaining constraints;

generate, by the language processing machine learning model in a single forward pass, the output sequence comprising a block of multiple candidate tokens;

compute local constraint signals for the block and compare the local constraint signals to a corresponding subset of the ledger to produce a syndrome for token verification;

based on the syndrome indicating a constraint violation, identify one or more violating token positions via a token-to-constraint mapping;

generate, by the language processing machine learning model in an additional single forward pass, one or more replacement candidate tokens for the one or more violating token positions while retaining other candidate tokens in the block;

update the ledger to reflect one or more satisfied constraints; and repeat block generation using the language processing machine learning model and syndrome-based token verification until the ledger indicates a terminal satisfied state or a termination token is produced.

2. The system of claim 1, wherein the updating of the ledger comprises decrementing, flipping, or clearing one or more ledger entries corresponding to the one or more satisfied constraints and storing metadata in association with the one or more ledger entries to support post-generation auditing and error analysis.

3. The system of claim 1, wherein the generating of the structural plan comprises generating parity indicators and bounded counters associated with delimiters, quote balance, terminators, and end-of-object flags.

4. The system of claim 3, wherein the generating of the structural plan further comprises generating delimiters, quote balance, terminators, and end-of-object flags associated with the parity indicators and the bounded counters.

5. The system of claim 1, wherein the parsing of the plan tokens produces a bounded-size ledger comprising bit fields and integer counters that are updated per block as constraints are satisfied.

6. The system of claim 1, wherein the generating of the block of the multiple candidate tokens comprises performing set block decoding with an entropy-bounded sampler to select a subset of tokens to reveal jointly based on predicted dependence.

7. The system of claim 1, wherein the computing of the local constraint signals comprises:

computing, over the block and adjacent context, parity values and counter deltas; and comparing the computed parity values and the computed counter deltas to corresponding entries in the ledger to produce the syndrome.

8. The system of claim 1, wherein the identifying of the one or more violating token positions comprises applying a predefined token-to-constraint mapping that associates particular constraint fields with token locations or neighborhoods.

9. The system of claim 1, wherein the generating of the one or more replacement candidate tokens comprises:

masking only the one or more violating token positions and re-sampling the masked one or more violating token positions while retaining other candidate tokens in the block; and invoking a grammar-constrained resampling fallback for one or more corresponding violating positions when a violation persists after a capped number of retries.

10. A method for blockwise token generation with selective error localization and repair, comprising:

generating, by a language processing machine learning model, prior to producing an output sequence, a structural plan comprising plan tokens that encode constraints expected to be satisfied by the output sequence;

parsing the plan tokens into a ledger of remaining constraints;

generating, by the language processing machine learning model in a single forward pass, the output sequence comprising a block of multiple candidate tokens;

computing local constraint signals for the block and comparing the local constraint signals to a corresponding subset of the ledger to produce a syndrome for token verification;

based on the syndrome indicating a constraint violation, identifying one or more violating token positions via a token-to-constraint mapping;

generating, by the language processing machine learning model in an additional single forward pass, one or more replacement candidate tokens for the one or more violating token positions while retaining other candidate tokens in the block;

updating the ledger to reflect one or more satisfied constraints; and repeating block generation using the language processing machine learning model and syndrome-based token verification until the ledger indicates a terminal satisfied state or a termination token is produced.

11. The method of claim 10, wherein the updating of the ledger comprises decrementing, flipping, or clearing one or more ledger entries corresponding to the one or more satisfied constraints and storing metadata in association with the one or more ledger entries to support post-generation auditing and error analysis.

12. The method of claim 10, wherein the generating of the structural plan comprises generating parity indicators and bounded counters associated with delimiters, quote balance, terminators, and end-of-object flags.

13. The method of claim 12, wherein the generating of the structural plan further comprises generating delimiters, quote balance, terminators, and end-of-object flags associated with the parity indicators and the bounded counters.

14. The method of claim 10, wherein the parsing of the plan tokens produces a bounded-size ledger comprising bit fields and integer counters that are updated per block as constraints are satisfied.

15. The method of claim 10, wherein the generating of the block of the multiple candidate tokens comprises performing set block decoding with an entropy-bounded sampler to select a subset of tokens to reveal jointly based on predicted dependence.

16. The method of claim 10, wherein the computing of the local constraint signals comprises:

computing, over the block and adjacent context, parity values and counter deltas; and comparing the computed parity values and the computed counter deltas to corresponding entries in the ledger to produce the syndrome.

17. The method of claim 10, wherein the identifying of the one or more violating token positions comprises applying a predefined token-to-constraint mapping that associates particular constraint fields with token locations or neighborhoods.

18. A non-transitory computer readable medium storing instructions that, when executed by one or more processors of a computing system, cause the computing system to:

generate, by a language processing machine learning model, prior to producing an output sequence, a structural plan comprising plan tokens that encode constraints expected to be satisfied by the output sequence;

parse the plan tokens into a ledger of remaining constraints;

generate, by the language processing machine learning model in a single forward pass, the output sequence comprising a block of multiple candidate tokens;

compute local constraint signals for the block and compare the local constraint signals to a corresponding subset of the ledger to produce a syndrome for token verification;

based on the syndrome indicating a constraint violation, identify one or more violating token positions via a token-to-constraint mapping; and generate, by the language processing machine learning model in an additional single forward pass, one or more replacement candidate tokens for the one or more violating token positions while retaining other candidate tokens in the block;

update the ledger to reflect one or more satisfied constraints; and repeat block generation using the language processing machine learning model and syndrome-based token verification until the ledger indicates a terminal satisfied state or a termination token is produced.

* * * * *